United States Patent [19]

Asanuma et al.

[11] Patent Number: 5,166,225

[45] Date of Patent: * Nov. 24, 1992

[54] PROCESS FOR PRODUCING OF CROSSLINKED POLYOLEFINS

[75] Inventors: Tadashi Asanuma; Kazuhiko Yamamoto, both of Osaka, Japan

[73] Assignee: Mitsui Toatsu Chemicals, Incorporated, Tokyo, Japan

[*] Notice: The portion of the term of this patent subsequent to Sep. 3, 2008 has been disclaimed.

[21] Appl. No.: 363,126

[22] Filed: Jun. 8, 1989

[30] Foreign Application Priority Data

Jun. 14, 1988 [JP] Japan ............... 63-146527
Apr. 28, 1989 [JP] Japan ............... 1-107488

[51] Int. Cl.⁵ .................... C08J 3/28; C08G 63/48
[52] U.S. Cl. ................... 522/112; 522/113; 522/129; 522/170; 525/72; 525/209
[58] Field of Search ............... 522/113, 129, 112, 170; 525/72, 209

[56] References Cited

U.S. PATENT DOCUMENTS

| | | | |
|---|---|---|---|
| 3,453,248 | 7/1969 | Gowdy et al. | 525/102 |
| 4,749,727 | 6/1988 | Tsuchiya | 522/170 |
| 4,921,926 | 5/1990 | Motegi et al. | 522/148 |
| 5,045,597 | 9/1991 | Asanuma et al. | 525/72 |

FOREIGN PATENT DOCUMENTS 0361744 4/1990 European Pat. Off. .

OTHER PUBLICATIONS

*World Patents Index Latest*, Week 8821; Derwent Publications Ltd., London, GB, AN 88-145239 & JP-A-63 088 707 (Hitachi Cable) Apr. 19, 1988.

*Primary Examiner*—Marion E. McCamish
*Assistant Examiner*—Mark A. Chapman
*Attorney, Agent, or Firm*—Burns, Doane, Swecker & Mathis

[57] ABSTRACT

A process for producing crosslinked polyolefins having improved physical properties is disclosed. The process comprises irradiating a copolymer of alkenylsilane and olefins, or a mixture of this copolymer and thereof with a polyolefin devoid of alkenylsilane segments.

41 Claims, No Drawings

PROCESS FOR PRODUCING OF CROSSLINKED POLYOLEFINS

BACKGROUND OF THE INVENTION

The present invention relates to a process for producing crosslinked polyolefins. As well as the novel polyolefins produced thereby.

Crosslinking reactions have been widely employed for improving the properties of polyolefins. However, attempts to crosslink α-olefin polymers such as polypropylene have resulted primarily in degradation reaction of the main rather than the desired crosslinking reaction.

Degradation, and its attendant molecular weight reduction, predominate over crosslinking reaction when radicals are generated by decomposition of peroxides or exposure to radiation. Accordingly, crosslinking has been carried out such that a monomer capable of inducing the crosslinking reaction upon hydrolysis, for example, alkoxyvinylsilane or the like, is initially grafted to the polyolefins, which is thereafter crosslinked. (See for example, Japanese Patent Laid-Open No. 117244/1983).

Polymers obtained by grafting alkoxyvinylsilane to polyolefins are effective to a certain extent for improving physical properties of the polyolefin that result from the subsequent crosslinking. However, processes for the synthesis of graft polymers are complicated and deterioration of the physical properties of the crosslinked polymer due to scission of the main chain remains an inevitable and critical problem of crosslinking reaction.

It is also difficult to introduce various comonomers into the main chain. In this connection, a process has been proposed to introduce vinylsilane into the main chain, and thereafter to crosslink the resultant copolymer with water (See, for example, U.S. Pat. No. 3,223,686).

The crosslinking with water, however, is disadvantageous in that the reaction does not readily processed and thus takes a longer time. A further disadvantage is that articles molded from such polymers to deform upon exposure to high temperatures. A still further a problem with this process is that it involves a relationally complicated operating procedure.

As to the production and application of copolymers of alkenylsilane and olefin, the present inventors have filed Japanese Patent Application Numbers 171020/1988 (corresponding to U.S. application Ser. No. 271,864), 45783/1988 (corresponding to U.S. application Ser. No. 284,680) and 34995/1989. These applications do not disclose radiation treatment of the polymers to effect crosslinking.

SUMMARY OF THE INVENTION

The present invention overcomes the problems and disadvantages of the prior art by providing a process for producing polyolefins having advantageous properties arising from a high degree of crosslinking.

An object of this invention is to improve the physical properties of polyolefins and more particularly to provide a process for producing crosslinked polyolefins in which no molecular weight reduction occurs due to degradation of the polymer backbone.

Another object of this invention is to provide a crosslinking process comprising simple operating procedures, that is capable of effecting the crosslinking reaction within a short period of time and results in no deformation of molded crosslinked articles during a molding operation.

A further object of the present invention is to provide a novel crosslinked polyolefin produced by the process described herein.

The above objects of the present invention can be achieved by providing a process for producing a crosslinked polyolefins comprising irradiating a copolymer of alkenylsilane and olefin, or a mixture of said copolymer and a polyolefin.

DETAILED DESCRIPTION OF THE INVENTION

Reference will now be made to the preferred embodiments of the invention.

The copolymer of alkenylsilane and olefin for use in the process of this invention is usually prepared by copolymerizing olefin with alkenylsilane in the presence of a so-called Ziegler-Natta catalyst composed of a transition metal salt and an organometallic compound. The method disclosed, for example, in U.S. Pat. No. 3,223,686 can be utilized for preparation of the copolymer. Accordingly, the disclosure of this patent is hereby expressly incorporated by reference, to the extent not inconsistent herewith. A graft copolymer of polyolefin may also be used. Graft polymerization is carried out by subjecting a polyolefin to heat treatment with alkenylsilane in the presence of a radical polymerization initiator such as peroxide.

The preferred alkenylsilane compounds for use in the process of the present invention have one or more Si-H linkages and are represented, for example, by the formula:

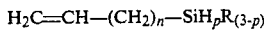

$$H_2C=CH-(CH_2)_n-SiH_pR_{(3-p)}$$

wherein n is 0 or an integer from 1 to 12, p is an integer from 1 to 3, and R is a hydrocarbon residue having from 1 to 12 carbon atoms.

Exemplary suitable alkenylsilanes include such compounds as vinylsilane, allylsilane, butenylsilane, pentanylsilane and a compound wherein from 1 to 3 of the hydrogen atoms of the Si-H linkages of these alkenylsilanes are replaced by chlorine atoms.

Exemplary suitable obefins for use in the invention are compounds represented by the formula:

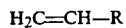

$$H_2C=CH-R$$

wherein R is a hydrogen atoms or a hydrocarbon group having from 1 to 12 carbon atoms. These compounds include, for example, α-olefins such as ethylene, propylene, 1-butene, 1-pentene, 1-hexene, 2-methyl-1-pentene, 1-heptene and 1-octene; and styrene and derivatives thereof.

The copolymer of olefin and alkenylsilane for use in the process of this invention can be prepared in the presence of the catalyst disclosed in the above United States Patent and composed of $TiCl_3$ and triethyl aluminum, and more preferably in the presence of various high-activity catalysts which have been developed thereafter and are capable of yielding polyolefin.

Copolymerization of the alkylsilane and olefin is generally carried out by a solvent process using an inert solvent. However, bulk polymerization or vapor-phase polymerization processes can also be employed.

Suitable catalysts for use in the preparation of the copolymer of the invention include catalyst system composed of a transition metal salt and an organometallic compound. The transition metal salt is preferably a titanium halide and the organometallic compound is preferably an organoaluminum compound.

Exemplary suitable catalyst systems include those consisting of a transition metal salt obtained by reducing titanium tetrachloride with metallic aluminum, hydrogen or an organoaluminum compound and thereafter modifying the resultant titanium trichloride with an electron donor, an organoaluminum compound, and optionally a further electron donor, such as an oxygen-containing organic compound; a transition metal catalyst obtained by supporting a titanium halide on a carrier such as magnesium halide or on a carrier of the same compound which was previously treated with an electron donor, an organoaluminum compound and optionally a further electron donor such as an oxygen-containing organic compound; and a transition metal catalyst obtained by dissolving a reaction product of magnesium chloride and an alcohol in a hydrocarbon solvent, followed by precipitat-ing the reaction product from the hydrocarbon by treating the resultant solution with a precipitant such as titanium tetrachloride, and optionally by treating the resultant precipitate with an electron donor such as an ester or an ether and thereafter treating the same with titanium halide, an organoaluminum compound and optionally a further electron donor such as an oxygen-containing organic compound.

Various catalyst systems are described in *Ziegler-Natta Catalysts and Polymerization* by John Boor, Jr. (Academic Press), *Journal of Macromolecular Science Reviews in Macromolecular Chemistry and Physics*, vol. 24(3), pp. 355–385 (1984), ibid. vol. 25(1), pp. 578–597 (1985).

The polymerization can also be carried out in the presence of a catalyst system consisting of a transition metal catalyst that is soluble in a hydrocarbon solvent, and alminoxan.

Preferred electron donors for use in the preparation of the catalyst systems will usually include oxygen-containing compounds such as ethers, esters, orthoesters and alkoxy-silicon compounds. Fruther, alcohols, aldehydes and water may also be used as the electron donor.

The organoaluminum compound is preferably selected from the group consisting of a trialkylaluminum, dialkylaluminum halides, alkylaluminum sesquihalides and alkylaluminum dihalides. Preferably, the alkyl groups of these compounds are selected from the group consisting of methyl, ethyl, propyl, butyl and hexyl groups, and the halides are selected from the group consisting of chloride, bromide and iodide.

The alminoxan is an oligomer or a polymer obtained by reacting the above organoaluminum compound with water or crystal water.

No particular limitation is improved on the proportion of alkenylsilane and olefin for use in the copolymerization or graft copolymerization of the present invention. When the resulting copolymer is used in admixture with polyolefin, the proportion of the alkenylsilane is generally from about 0.001 to about 30 mol % and preferably from about 0.1 to about 10 mol % of the copolymer. When the copolymer is used singly, the proportion of the alkenylsilane is from about 0.001 to about 5 mol % of the copolymer.

No particular restriction is put upon the molecular weight of the copolymer. When the copolymer is used as mixture, the preferred molecular weight of the copolymer is about the same as or lower than that of the polyolefin to be blended to improve physical properties. In some cases, polymerization may be carried out so as to replicate as closely as possible the characteristics (for example, composition and molecular weight) of polyolefin that is devoid of alkenylsilane.

No particular limitation is imposed upon the process for grafting alkenylsilane to polyolefin. The graft copolymerization may be carried out by conventional procedures and under conventional conditions. Generally, the graft copolymer can be readily obtained by heating the polyolefin above the decomposition temperature of a radical initiator, in the presence of alkenylsilane.

Polyolefins suitable for use in the graft copolymerization, as well as, for blending with the formed copolymer, are polymers formed from monomers of the formula:

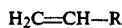

wherein R is a hydrogen atom or a hydrocarbon group having from 1 to 12 carbon atoms.

Exemplary suitable polyolefins includes polymers formed from the above olefins wherein R is alkyl such as ethylene, propylene, 1-butene, 1-pentene, 1-hexene, 2-methyl-1-pentene, 1-heptene and 1-octene and mixtures thereof; and polymers of styrene and its derivatives.

Exemplary suitable polymers include homopolymers and random copolymers of these olefin compounds as well as so-called block copolymers prepared by initially homopolymerizing one of the above olefin compounds, or copolymerizing the same with a small amount of other olefin compound, and thereafter copolymerizing the polymer thus produced with one or more other olefin compounds. The process of the invention is particularly effective, when applied to crosslinking of homopolymers and copolymers of α-olefin such as propylene, which are difficult to crosslinking by conventional method.

The process for preparing these polyolefins is known, and various grades of such polyolefins are available on the market. These polyolefins can be prepared by the same procedures described above in connection with copolymerization of olefin and alkenylsilane, except that no alkenylsilane is used.

In the process of the invention, the above copolymer of alkenylsilane and olefin is generally used in admixture with polyolefin devoid of alkenylsilane segments, although the copolymer can be used singly without such admixture.

Preferred content of alkenylsilane in the polyolefin copolymer alone or in the mixture thereof is about 0.1 wt % or more. When used as a mixture, the amount of the copolymer of alkenylsilane and olefin depends upon the content of alkenylsilane in the copolymer. It is preferred that the copolymer be present in the mixture an amount of at least about 0.1 wt %. It is preferred that the mixture exposed to radiation contain from about 1 ppm by weight to about 1 wt %, and especially about 0.005 wt % of alkenylsilane. Various known additives can be incorporated in the mixture, and no particular limitation is put on the use of these additives.

General methods for crosslinking by exposure to radiation are described in the literature, for example:
(1) Plastics, vol. 25, No. 5, (1974), Machi, "Characteristics and Industrial Application of Radiation Crosslinking"

(2) Functional Materials, November (1982), Harayama, "Radiation Crosslinked Polyethylene Foam"
(3) W. A. Salman, J. Appln. Polymer Sci, 16, 671 (1972)

The crosslinking reaction effected by exposure to radiation is usually carried out after molding the polymer mixture. When the degree of crosslinking is relatively low, molding can also be conducted after radiation exposure.

The crosslinking reaction can be conducted either in an atmosphere of inert gas or in the presence of oxygen. The reaction environment can thus be selected at will according to the desired result as is well within the skill of those practiced in the art.

Exemplary suitable type of radiation for use in the process of the invention include alpha-rays, beta-rays, gamma-rays, X-rays and neutron-rays. Gamma-rays and beta-rays and particularly preferred. The irradiation dose is generally from about ten rads to about 100 M rads. The duration of irradiation is usually from about 1 sec to about 10 minutes for beta rays (electron beam), 1 minutes to about 10 days for gamma rays. Irradiation at amounts and for period beyond these ranges does not yield any significant increase in effect. Similarly irradiation below these ranges has almost no effect. No particular restriction is imposed on the temperature during irradiation. Irradiation may be carried out below the softening temperature of the polyolefin. Irradiation at room temperature usually gives satisfactory results.

EXAMPLES

Several preferred embodiments will be described in the following examples. It will be appreciated that these example are provided solely to illustrate the invention in further detail, and accordingly should not be construed as limiting the scope of the present invention.

Example 1

A vibration mill was prepared, equipped with 4 grinding pots, each having a capacity of 4 l and containing 9 kg of steel balls 12 mm in diameter. In a nitrogen atmosphere, each pot was charged with 300 g of magnesium chloride, 60 ml of tetraethoxysilane and 45 ml of $\alpha,\alpha,\alpha$-trichlorotoluene, and grinding was conducted for 40 hours.

A 5 l flask was charged with 300 g of the above-obtained ground product, whereafter 1.5 l of titanium tetrachloride and 1.5 l of toluene were added and stirred at 100° C. for 30 minutes. The resulting mixture was allowed to stand, and then an additional 1.5 ( of titanium tetrachloride and 1.5 l of toluene were added, followed by stirring at 100° C. for 30 minutes. The supernatant liquid was then removed from the reaction mixture, and the residual solid was subjected to repeated washing with n-hexane to obtain a slurry of a transition metal catalyst. A part of the slurry was sampled and analyzed. The titanium content was found to be 1.9 wt %.

A pressure-tight glass autoclave having a capacity of 200 ml was charged in a nitrogen atmosphere with 40 ml of toluene, 50 mg of the above-obtained transition metal catalyst, 0.128 ml of diethylaluminum chloride, 0.06 ml of methyl toluate and 0.20 ml of triethylaluminum. Thereafter 4.0 g of vinylsilane was added under pressure and propylene was charged to a pressure of 5 kg/cm². Polymerization was carried out at 70° C. for 2 hours under constant pressure. After the reaction, the resulting slurry was taken out, filtered and dried to yield 43 g of powder. The inherent viscosity of this powder (hereinafter abbreviated as $\eta_{inh}$) was measured at 135° C. in a tetrahydronaphthalene solution.

$\eta_{inh}$ was found to be 1.61 dl/g. The melting point and crystallization temperature were measured using an apparatus for differential thermal analysis. Maximum peak temperature was determined in these measurements at a temperature rise or fall rate of 10° C./min. The melting point of the powder was 156° C. and the crystallization temperature was 118° C. The powder thus obtained was crystalline polypropylene. According to the elemental analysis, the content of vinylsilane units was 1.8 wt %.

To 10000 parts by weight of the polypropylene copolymer obtained above, 10 parts by weight of a phenol base stabilizer and 15 parts by weight of calcium stearate were added. The resulting mixture was hot-kneaded to prepare sheets of 1 cm×5 cm in area, having thickness of 2 mm and 1 mm, respectively.

EXAMPLE 2

Polymerization of propylene was carried out by the same procedure as described in Example 1, except that the vinylsilane was obtained. The polypropylene homopolymer thus obtained had an $\eta_{inh}$ of 1.65 and a residual ratio in Soxhlet extraction (hereinafter abbreviated as II) of 97.1%. The residual ratio was calculated according to the following equation.

$$\text{Residual ratio (\%)} = \frac{\text{weight of powder after extraction}}{\text{weight of powder before extraction}} \times 100$$

The polypropylene powder thus obtained was mixed with an equal amount of the copolymer produced in Example 1.

Following the same procedure as in Example 1, the phenol base stabilizer and calcium stearate were added to the resultant polymer mixture, and hot kneaded to prepare sheets.

Example 3

Sheets were prepared by the same procedure as described in Example 1, except that a copolymer obtained by using allylsilane in place of vinylsilane and having an allylsilane content of 1.3 wt % was used.

Example 4

A polymer blend was prepared by mixing 10 parts by weight of the copolymer produced in Example 1 and 90 parts by weight of a block copolymer of propylene and ethylene having an ethylene content of 8 wt %.

Sheets were prepared from the above polymer mixture following the same procedures ad described in Example 1.

Example 5

A copolymer of vinylsilane and 1-butene was obtained by following the same procedures as described in Example 1, except that 1-butene was used in place of propylene.

A polymer blend was prepared by mixing 10 parts by weight of the copolymer thus obtained and 90 parts by weight of a block copolymer of propylene and ethylene having an ethylene content of 8 wt %.

Sheets were prepared from the above polymer mixture following the same procedures as described in Example 1.

EXAMPLES 6-15 and Comparative Examples 1-9

The sheets produced in Examples 1-5 were exposed

Flexual modulus (kg/cm$^2$) ASTM D747-63 (23° C.)
Izod (notched) impact strength (kg cm/cm$^2$) ASTM D256-56 (23° C., −10° C.)

TABLE 1

| No. | Sheet Treated (Example No.) | Polymer type | Gamma ray (M rad) | Electron ray (M rad) | Yield strength (kg/cm$^2$) | Flexural modulus (kg/cm$^2$) | Izod impact strength (kg cm/cm$^2$) 23° C. | Izod impact strength (kg cm/cm$^2$) −10° C. | Degree of Cross-linking (%) |
| --- | --- | --- | --- | --- | --- | --- | --- | --- | --- |
| Example 6 | 1 | Pr—V.Si | 10 | — | 410 | 14000 | — | — | 93.5 |
| Example 7 | 1 | (Copolymer) | — | 5 | 420 | 14500 | — | — | 96.5 |
| Comparat. Ex. 1 | 1 | | — | — | 370 | 12000 | — | — | 0.5 |
| Example 8 | 2 | Pr and | 10 | — | 400 | 12500 | — | — | 45.5 |
| Example 9 | 2 | Pr—V.Si | — | 5 | 405 | 13000 | — | — | 56.5 |
| Comparat. Ex. 2 | 2 | (Blend) | — | — | 375 | 11500 | — | — | 0.5 |
| Example 10 | 3 | Pr—A.Si (Copolymer) | 10 | — | 405 | 14000 | — | — | 89.5 |
| Example 11 | 3 | (Compolymer) | — | 5 | 410 | 14000 | — | — | 92.5 |
| Comparat. Ex. 3 | 3 | | — | — | 365 | 12000 | — | — | 0.5 |
| Example 12 | 4 | Pr—V.Si and | 10 | — | 310 | 11500 | 6.5 | 3.5 | 45.5 |
| Example 13 | 4 | Pr-Et (Blend) | — | 5 | 320 | 11900 | 7.5 | 3.5 | 50.5 |
| Comparat. Ex. 4 | 4 | | — | — | 295 | 10500 | 6.5 | 3.0 | 0.5 |
| Example 14 | 5 | Bu-V.Si and | 10 | — | 310 | 11500 | 7.0 | 3.5 | 50.5 |
| Example 15 | 5 | Pr-Et (Blend) | — | 5 | 320 | 12000 | 7.5 | 3.5 | 55.5 |
| Comparat. Ex. 5 | 5 | | — | — | 290 | 10000 | 7.0 | 3.5 | 0.5 |
| Comparat. Ex. 6 | | Pr | 10 | — | 350 | 12000 | — | — | 0.5 |
| Comparat. Ex. 7 | | Pr-Et | 10 | — | 290 | 10100 | 4.5 | 2.5 | 0.5 |
| Comparat. Ex. 8 | | Pr | — | 5 | 345 | 12000 | — | — | 0.5 |
| Comparat. Ex. 9 | | Pr-Et | — | 5 | 285 | 10100 | 4.5 | 2.5 | 0.5 |

LEGEND:
Pr = Propylene.
V.Si = Vinylsilane.
A.Si = Allylsilane.
Et = Ethylene to gamma-rays or electron-rays, under the conditions illustrated in Table 1. During the irradiation, electron-rays of 750 kV, 4.81 mA were passed through the specimens at a velocity of 1 m/min. Yield strength, flexural modules and Izod impact strength of the specimens were measured before and after irradiation.

The degree of crosslinking was evaluated by placing a sheet specimen in a vessel of #100 mesh wire gauze and extracting with boiling tetrahydronaphthalene for 24 hours. The degree of crosslinking was calculated based on the residual amount in the vessel after extraction.

For the purpose of comparison, the homopolymer of propylene and copolymer of propylene and ethylene which were prepared in Examples 1 and 4 were also exposed to 10 Mrads of gamma-rays (Comparative Examples 6 and 7) or to 5 M rads of electron-rays (750 kV) (Comparative Examples 8 and 9). The physical properties of these specimens were measured after exposure to irradiation. Irradiation with gamma-rays and electron-rays were conducted in the air and in a nitrogen atmosphere, respectively.

The results are illustrated in Table 1.

The physical properties were measured in accordance with the following ASTM specifications.

Yield strength (kg/cm$^2$) ASTM D638 (23° C.)

Although the present invention has been described in connection with various preferred embodiments thereof, it is evident that various other embodiments will be apparent to those skilled in the art from a reading of the present specification and practice of the invention described herein. Accordingly, the true scope and spirit of the invention must be construed commensurate with the scope of the following claims.

We claim:

1. A process for producing a crosslinked polyolefin, comprising irradiating a copolymer of an alkenylsilane compound and an olefin compound.

2. The process of claim 1, wherein said irradiating step comprises applying radiation in an amount from about ten rads to about 100 M rads.

3. The process of claim 1, wherein said irradiating step is effected using gamma rays or electron rays.

4. The process of claim 1, wherein said alkenylsilane compound is present in an amount from about 0.001 to about 5 mole percent of said copolymer.

5. The process of claim 1, wherein said alkenylsilane compound has the formula (I):

$$H_2C=CH-(CH_2)_n-SiH_pR_{(3-p)} \qquad (I)$$

wherein n is 0 or an integer from 1 to 12, p is an integer from 1 to 3, and R is a hydrocarbon residue having from 1 to 12 carbon atoms.

6. The process of claim 1, wherein said alkenylsilane compound is selected from the group consisting of vinylsilane, allylsilane, butenylsilane and pentenylsilane.

7. The process of claim 1, wherein said olefin compound is a $C_2$–$C_{14}$ olefin.

8. The process of claim 7, wherein said olefin is selected from the group consisting of ethylene, propylene, 1-butene, 2-pentene, 1-hexene, 2-methyl-1-pentene, 1-heptene, 1-octene, and mixtures thereof.

9. The process of claim 1, wherein said copolymer is prepared by copolymerizing an olefin compound with an alkenylsilane compound in the presence of a catalyst containing a transition metal salt and an organometallic compound.

10. The process of claim 1, wherein said irradiating step is effected in an inert gas atmosphere.

11. The process of claim 1, wherein said irradiating step is effected in the presence of oxygen.

12. A crosslinked polyolefin composition produced by the process of claim 1.

13. The composition of claim 12, comprising about 0.001 to about 5 mole percent of said alkenylsilane.

14. The composition of claim 12, wherein said alkenylisilane has the formula (I):

$$H_2C=CH-(CH_2)_n-SiH_pR_{(3-p)} \qquad (I)$$

wherein n is 0 or an integer from 1 to 12, p is an integer from 1 to 3, and R is a hydrocarbon residue having from 1 to 12 carbon atoms.

15. The composition of claim 12, wherein said alkenylsilane is selected from the group consisting of vinylsilane, allylsilane, butenylsilane and pentenylsilane.

16. The composition of claim 12, wherein said olefin is a $C_2$–$C_{14}$ olefin.

17. The composition of claim 16, wherein said olefin is selected from the group consisting of ethylene, propylene, 1-butene, 2-pentene, 1-hexene, 2-methyl-1-pentene, 1-heptene, 1-octene, and mixtures thereof.

18. A process for producing a crosslinked polyolefin, comprising irradiating a mixture of (1) a copolymer of an alkenylsilane compound and an olefin compound and (2) a polyolefin compound.

19. The process of claim 18, wherein said irradiating step comprises applying radiation in an amount from about ten rads to about 100 M rads.

20. The process of claim 18, wherein said irradiating step is effected using gamma rays or electron rays.

21. The process of claim 18, wherein said alkenylsilane compound is present in an amount from about 0.001 to about 30 mole percent of said copolymer.

22. The process of claim 21, wherein said alkenylsilane compound is present in an amount from about 0.1 to about 10 mole percent of said copolymer.

23. The process of claim 18, wherein said mixture contains at least about 0.1 wt % of said copolymer.

24. The process of claim 18, wherein said mixture contains from about 1 ppm by weight to about 1 wt % of said alkenylsilane.

25. The process of claim 24, wherein said mixture contains about 0.005 wt % of said alkenylsilane.

26. The process of claim 18, wherein said alkenylsilane compound has the formula (I):

$$H_2C=CH-(CH_2)_n-SiH_pR_{(3-p)} \qquad (I)$$

wherein n is 0 or an integer from 1 to 12, p is an integer from 1 to 3, and R is a hydrocarbon residue having from 1 to 12 carbon atoms.

27. The process of claim 18, wherein said alkenylsilane compound is selected from the group consisting of vinylsilane, allylsilane, butenylsilane and pentenylsilane.

28. The process of claim 18, wherein said olefin compound is a $C_2$–$C_{14}$ olefin.

29. The process of claim 28 wherein said olefin is selected from the group consisting of ethylene, propylene, 1-butene, 2-pentene, 1-hexene, 2-methyl-1-pentene, 1-heptene, 1-octene, and mixtures thereof.

30. The process of claim 18 wherein said copolymer is prepared by copolymerizing an olefin compound with an alkenylsilane compound in the presence of a catalyst containing a transition metal salt and an organometallic compound.

31. The process of claim 18, wherein said irradiating step is effected in an inert gas atmosphere.

32. The process of claim 18, wherein said irradiating step is effected in the presence of oxygen.

33. The process of claim 18, wherein said copolymer has a molecular weight about the same as or lower than that of said polyolefin.

34. The process of claim 18, wherein said copolymer is blended with said polyolefin.

35. The process of claim 34, wherein said alkenylsilane is present in said blend in an amount from about 1 ppm by weight to about 1 weight percent.

36. A crosslinked polyolefin composition produced by the process of claim 18.

37. The composition of claim 36, wherein said copolymer comprises about 0.001 to about 30 mole percent of said alkenylsilane.

38. The composition of claim 37, wherein said copolymer comprises about 0.1 to about 10 mole percent of said alkenylsilane.

39. The composition of claim 36, comprising about 0.1 wt % of said copolymer.

40. The composition of claim 36, comprising about 1 ppm, by weight, to about 1 wt % of said alkenylsilane.

41. The composition of claim 40, comprising about 0.005 wt % of said alkenylsilane.

* * * * *